United States Patent
Kanzaki et al.

(10) Patent No.: US 12,066,681 B2
(45) Date of Patent: Aug. 20, 2024

(54) LENS UNIT

(71) Applicant: NIDEC SANKYO CORPORATION, Nagano (JP)

(72) Inventors: Yosuke Kanzaki, Nagano (JP); Toshio Shirotori, Nagano (JP); Tadashi Komiyama, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 533 days.

(21) Appl. No.: 17/439,791

(22) PCT Filed: Mar. 4, 2020

(86) PCT No.: PCT/JP2020/009184
§ 371 (c)(1),
(2) Date: Sep. 15, 2021

(87) PCT Pub. No.: WO2020/198285
PCT Pub. Date: Sep. 24, 2020

(65) Prior Publication Data
US 2022/0171151 A1 Jun. 2, 2022

(30) Foreign Application Priority Data
Mar. 20, 2019 (JP) .................................. 2019-052249

(51) Int. Cl.
*G02B 7/02* (2021.01)
*G02B 7/00* (2021.01)
*G03B 17/12* (2021.01)

(52) U.S. Cl.
CPC ............ *G02B 7/021* (2013.01); *G02B 7/008* (2013.01); *G03B 17/12* (2013.01)

(58) Field of Classification Search
CPC .......... G02B 7/02; G02B 7/021; G02B 7/022; G02B 7/023; G02B 7/025; G02B 7/026;
(Continued)

(56) References Cited

U.S. PATENT DOCUMENTS 6,942,349 B2  9/2005 Inamoto
8,475,003 B2  7/2013 Takashige et al.
(Continued)

FOREIGN PATENT DOCUMENTS

CN  1499243   5/2004
CN  1700047   11/2005
(Continued)

OTHER PUBLICATIONS

"Office Action of China Counterpart Application", issued on Jun. 12, 2023, with English translation thereof, pp. 1-15.
"International Search Report (Form PCT/ISA/210) of PCT/JP2020/009184," mailed on May 26, 2020, with English translation thereof, pp. 1-4.
"Office Action of China Counterpart Application", issued on Nov. 24, 2022, with English translation thereof, pp. 1-20.

*Primary Examiner* — Ephrem Z Mebrahtu
(74) *Attorney, Agent, or Firm* — JCIPRNET

(57) ABSTRACT

Provided is a lens unit capable of maintaining suitable image formation characteristics even with changes in temperature. The fourth lens outer peripheral face of a fourth lens is not in contact with the inner peripheral face of a second accommodation part. A fifth lens is made of glass, is press fitted and fixed to a resin-made lens holder to form an integrated fifth lens body, and is housed in a lens-barrel. A stepped part formed to engage with a stepped part in the fourth lens is provided in the lens holder outside the fifth lens on the object side of the fifth lens body. A fifth lens body outer peripheral face that is an outermost peripheral face of the fifth lens body comes in contact with the inner peripheral face of the second accommodation part.

8 Claims, 4 Drawing Sheets

(58) Field of Classification Search
CPC .... G02B 7/028; G02B 7/003; G02B 13/0045; H04N 5/2254; G03B 17/12
See application file for complete search history.

(56) References Cited

U.S. PATENT DOCUMENTS

| | | | |
|---|---|---|---|
| 10,527,814 | B2 | 1/2020 | Komiyama et al. |
| 2009/0086342 | A1 | 4/2009 | Seki |
| 2015/0260943 | A1 | 9/2015 | Yan et al. |
| 2015/0323708 | A1 | 11/2015 | Hashimoto et al. |
| 2019/0004274 | A1* | 1/2019 | Nakajima ............... G02B 7/021 |
| 2019/0278048 | A1 | 9/2019 | Kanzaki |
| 2020/0116971 | A1* | 4/2020 | Kanzaki ................. B29D 11/00 |
| 2020/0223164 | A1* | 7/2020 | Kanzaki ................. G02B 7/025 |

FOREIGN PATENT DOCUMENTS

| | | |
|---|---|---|
| CN | 102016676 | 4/2011 |
| CN | 104871056 | 8/2015 |
| CN | 107884901 | 4/2018 |
| JP | 2009103939 | 5/2009 |
| JP | 2014170123 | 9/2014 |
| JP | 2015176143 | 10/2015 |
| JP | 2018132657 | 8/2018 |
| JP | 2019133093 | 8/2019 |

* cited by examiner ical field

LENS UNIT

CROSS-REFERENCE TO RELATED APPLICATION

This application is a 371 application of the international PCT application serial no. PCT/JP2020/009184, filed on Mar. 4, 2020, which claims the priority benefits of Japan application no. 2019-052249, filed on Mar. 20, 2019. The entirety of each of the above-mentioned patent applications is hereby incorporated by reference herein and made a part of this specification.

TECHNICAL FIELD

The present invention relates to a lens unit which includes a plurality of lenses and a lens-barrel which accommodates and fixes these lenses.

BACKGROUND ART

For example, as an optical system which is used in an imaging device mounted on an automobile, a monitoring camera or the like, a lens unit is used in which a plurality of lenses is arranged in an optical axis (optical axis of an imaging device) direction from an object side to an image side (imaging element side). The lens unit is designed so that an image of an object by visible light is satisfactorily formed on an imaging element. Therefore, positional relationships between the respective lenses and positional relationships between the lenses and a lens-barrel and between the lens unit and an imaging element are required to be fixed with a high degree of accuracy and, in addition, it is required that a large load is not applied to the respective lenses.

A lens unit which satisfies the above-mentioned requirements is, for example, described in Patent Literatures 1 and 2. In a technique described in Patent Literature 1, a lens-barrel which accommodates and holds a plurality of lenses is threadedly engaged and fixed to a housing on an outer side by using a screw part which is formed on an outer periphery of the lens-barrel to structure an imaging device. In this case, an inner face of the portion where the screw part of the outer periphery of the lens-barrel is formed and the lenses in the inside of the lens-barrel are not contacted with each other and thereby, positional accuracy of the lenses in the lens-barrel is enhanced, and tightening torque of the lens unit with respect to the lens-barrel, or of the lens-barrel can be managed to a constant value. As a result, optical performance of an imaging device which uses the lens unit can be stably enhanced.

Further, in a technique described in Patent Literature 2, when a first lens through a fourth lens are to be accommodated and fixed to an inside of a lens-barrel (lens tube), a surface perpendicular to an optical axis and a side face parallel to the optical axis of the first lens and the fourth lens are fixed to the lens-barrel. On the other hand, surfaces perpendicular to the optical axis of the second lens and the third lens are fixed to adjacent lenses (first lens or fourth lens), and side faces parallel to the optical axis of the second lens and the third lens are not contacted with the lens-barrel. According to this structure, in assembling, the optical axes of the respective lenses can be stably aligned with an optical axis of an imaging device with a high degree of accuracy.

CITATION LIST

Patent Literature

Patent Literature 1 Japanese Patent Laid-Open No. 2009-103939
Patent Literature 2 Japanese Patent Laid-Open No. 2015-176143

SUMMARY OF THE INVENTION

Problems to be Solved by the Invention

Glass and resin material are used as material of lens which is used in such a lens unit. The former is material whose mechanical strength is high but expensive, and the latter is material whose mechanical strength is low but inexpensive. Further, for example, in a case that a shape of a lens is formed in an aspheric surface shape, the latter is particularly inexpensive in comparison with the former. Further, a thermal expansion coefficient of the former is smaller and thus, the former is preferably used for a lens on which thermal expansion particularly exerts adverse influence optically. Considering these points, it is determined that which lens is made of glass or made of resin material.

Further, a lens-barrel is generally made of resin material. However, a lens requires satisfactory optical characteristics (optical transparency and the like) and thus, amorphous plastic such as polycarbonate is used as resin material for a lens and, on the other hand, a lens-barrel requires a high weather-resistant property instead of requiring optical characteristics and thus, crystalline plastic such as polyethylene added with glass fibers is preferably used as resin material for a lens-barrel. Thermal expansion coefficients of glass, amorphous plastic and crystalline plastic are different from each other, and that of glass is the smallest in these materials and, generally, the thermal expansion coefficient of amorphous plastic is the largest.

As described above, in a case that there is a difference of thermal expansion coefficients between lenses which are used or between a lens and a lens-barrel, when temperature changes, a force is applied to a lens due to a thermal expansion difference and thereby, distortion may occur in the lens. As a result, when temperature changes, imaging characteristics of a lens unit may be deteriorated.

In view of the problem described above, the present invention provides a lens unit which is capable of maintaining satisfactory imaging characteristics even in a case that temperature changes.

Means to Solve the Problems

The present invention provides a lens unit including a first lens group disposed on an object side along an optical axis, a second lens group disposed on an image side along the optical axis with respect to the first lens group, a diaphragm disposed between the first lens group and the second lens group, and a lens-barrel which holds the first lens group, the diaphragm and the second lens group. One of an object side adjacent lens, which is disposed on the most image side in the first lens group and is adjacent to the diaphragm in a direction of the optical axis, and an image side adjacent lens, which is disposed on the most object side in the second lens group and is adjacent to the diaphragm in the direction of the optical axis, is one side lens made of glass, and the other of the object side adjacent lens and the image side adjacent lens is the other side lens made of resin material, and the lens-barrel is made of resin material which is different from the other side lens. The object side adjacent lens, the diaphragm and the image side adjacent lens are accommodated in a lens accommodation part provided in the lens-barrel, the one side lens is directly or indirectly abutted with an inner peripheral face of the lens accommodation part and thereby, a positional relationship between the lens-barrel and the one side lens in a direction perpendicular to the optical axis is fixed, and the other side lens is not contacted with the inner peripheral face and is engaged with the one side lens and thereby, a positional relationship between the one side lens and the other side lens in the direction perpendicular to the optical axis is fixed.

According to this structure, the other (the other side lens) is not abutted with an inner peripheral face of the lens accommodation part, and a positional relationship in a direction perpendicular to the optical axis is fixed by engaging with the one side lens and thereby, a positional relationship with respect to the lens-barrel in this direction is consequently fixed. Therefore, even in a case that the other side lens and the lens-barrel are made of different resin materials and there is a difference of thermal expansion coefficients, the other side lens is not contacted with the lens-barrel and thus, distortion of the other side lens can be prevented from occurring due to a difference of expansion and shrinkage between the other side lens and the lens-barrel accompanied with temperature change. Accordingly, deterioration of resolution is restrained. Further, only one (one side lens) made of glass is abutted with an inner peripheral face of the lens accommodation part of the lens-barrel and thereby, the position in a direction perpendicular to the optical axis is fixed. Since one side lens is made of glass, its thermal expansion coefficient is low, and occurrence of expansion and shrinkage accompanied with temperature change can be suppressed. Therefore, occurrence of distortion of the one side lens accompanied with temperature change is restrained, and deterioration of image forming characteristics accompanied with temperature change is restrained.

Further, an outer side of the one side lens viewed in the optical axis is supported by a lens holder which is made of resin material similar to the other side lens, and an outer peripheral face around the optical axis of the lens holder is abutted with the inner peripheral face. According to this structure, the one side lens made of glass and the lens holder are combined with each other to constitute a lens body as described above and thus, the lens body can be similarly treated as a lens made of resin material. In other words, the lens holder is made of resin material similar to the other side lens and thus, a difference of thermal expansion coefficients of the lens holder and the other side lens is small. Therefore, the lens holder and the other side lens occur expansion and shrinkage substantially equal to each other accompanied with temperature change and thus, the other side lens can be restrained from being distorted by the lens holder. Accordingly, deterioration of resolution can be restrained.

Further, the one side lens is the image side adjacent lens and the other side lens is the object side adjacent lens. According to this structure, the image side adjacent lens located on an image side with respect to the diaphragm is made of glass. As a result, variation of a view angle caused by temperature change is restrained.

Further, in the second lens group, an image side lens is provided so as to be adjacent to the image side adjacent lens on an image side, the image side lens is engaged with a placing face of the lens accommodation part on an image side, the lens holder is provided with a plurality of protruded parts which are protruded to an image side, the plurality of the protruded parts is sorted into a plurality of protruded part groups depending on a protruding amount, and a plurality of the protruded parts which belong to one protruded part group is engaged with the image side lens on an image side and thereby, movement to an image side of the image side adjacent lens is restricted. According to this structure, a distance between the image side lens and the image side adjacent lens is determined by a protruding amount of the protruded part. In this case, a plurality of the protruded part groups in which protruding amounts are different from each other is provided and, when only a protruded part of a selected protruded part group is set to be abutted with the image side lens, the distance can be finely adjusted. On the other hand, the image side lens is engaged with the placing face and, as a result, the image side adjacent lens is also indirectly engaged with the placing face.

Further, the diaphragm is formed with a plurality of positioning holes in a circumferential direction around the optical axis, each of the positioning holes penetrating through the diaphragm in the direction of the optical axis, the lens holder is formed with a plurality of protruded parts protruded to an object side so as to correspond to the positioning holes, and the diaphragm is attached to a side of the image side adjacent lens by engaging the protruded parts with the positioning holes. According to this structure, the diaphragm can be fixed to the lens holder (image side adjacent lens) by using the protruded parts and the positioning holes. As a result, manufacturing is easily performed and a positional relationship between the image side adjacent lens and the diaphragm is maintained with a high degree of accuracy.

Further, a length of the positioning hole along a circumferential direction around the optical axis is set to be larger than a length along the circumferential direction of the protruded part corresponding to the positioning hole. According to this structure, work for attaching the diaphragm to the lens holder (image side adjacent lens) is easily performed.

Effects of the Invention

According to the present invention, a lens unit is obtained in which satisfactory imaging characteristics are maintained even in a case when temperature changes.

DESCRIPTION OF EMBODIMENTS

Figure 1:
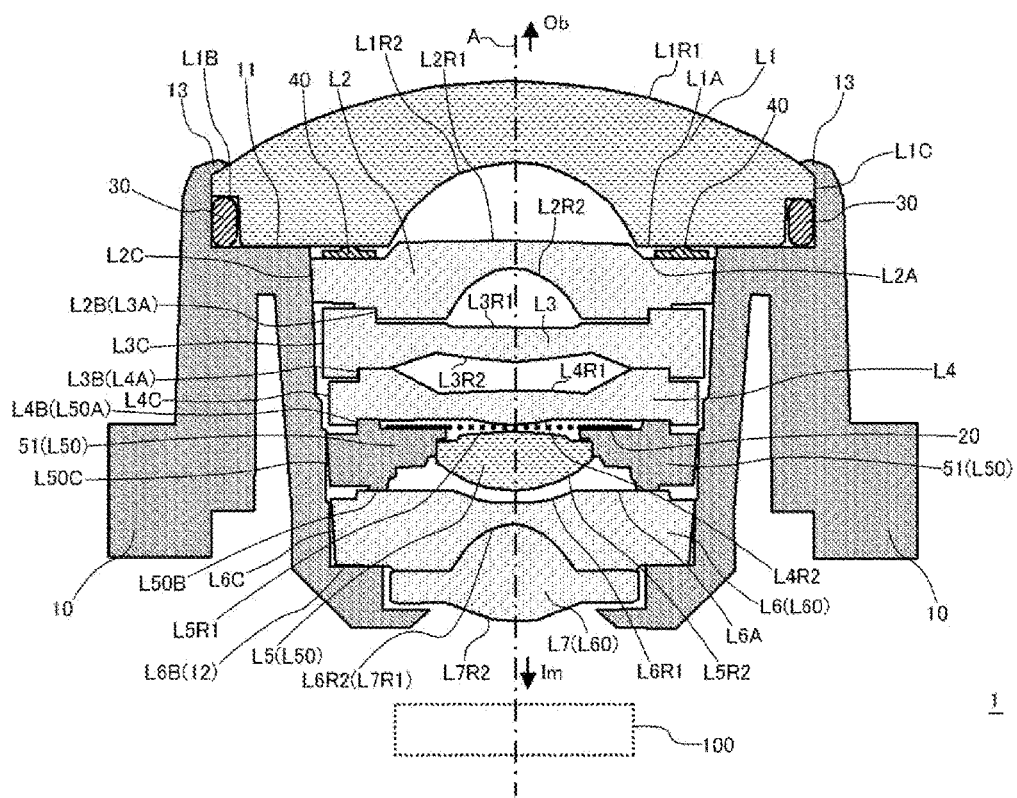
FIG. 1 is a cross-sectional view showing a lens unit in accordance with an embodiment of the present invention.

An embodiment of the present invention will be described in detail below with reference to the accompanying drawings. FIG. 1 is a cross-sectional view showing a lens unit 1 along an optical axis "A" in accordance with an embodiment of the present invention. In FIG. 1, an object (Ob) side is an upper side in the drawing and an image (Im) side is a lower side in the drawing, and an imaging element 100 is located at the lowest part in the drawing. Each of the lenses "L1" through "L7" is directly or indirectly fixed to a lens-barrel 10. In FIG. 1, the respective lenses, a diaphragm 20 and structures for fixing the respective lenses to a lens-barrel 10 are mainly described. Actually, a structure for fixing a positional relationship between the imaging element 100 and the lens-barrel 10 is also provided, but this structure is not shown.

The imaging element 100 is a two-dimensional CMOS image sensor and respective pixels are arranged in two dimensions in a plane perpendicular to the optical axis "A" and, actually, the imaging element 100 is covered by a cover glass (not shown). In FIG. 1, the lens unit 1 is structured which includes a first lens "L1" through a seventh lens "L7". The lens unit 1 is structured so that a visible light image of an imaging object is formed on the imaging element 100 (image surface) in a desired visual field and a desired mode.

In FIG. 1, the first lens "L1" is a fisheye lens provided on the most object side (upper side in the drawing) and a visual field and the like of an imaging device are mainly determined by the first lens "L1". The second lens "L2", the third lens "L3", the fourth lens "L4", the fifth lens "L5", the sixth lens "L6" and the seventh lens "L7" are successively disposed in this order on the imaging element 100 side (image side) with respect to the first lens "L1". Each of the lenses has a substantially symmetric shape around the optical axis "A". Further, a diaphragm 20 for limiting a flux of light is provided between the fourth lens "L4" and the fifth lens "L5". Further, a light shading plate for removing unnecessary light is also appropriately provided between the second lens "L2" and the third lens "L3", but it is not shown in FIG. 1.

Figure 2:
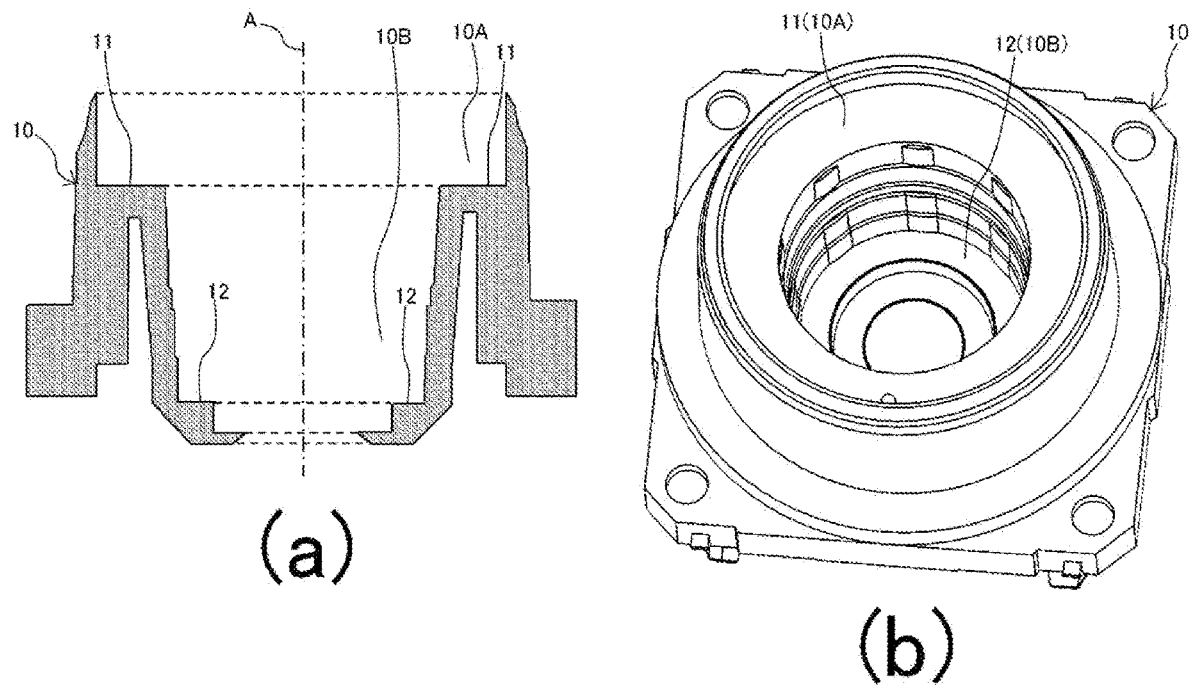
In FIG. 2, (a) is a cross-sectional view showing a lens-barrel which is used in a lens unit in accordance with an embodiment of the present invention, and (b) is a perspective view.

Further, in FIG. 2, (a) is a cross-sectional view showing only the lens-barrel 10 along the optical axis "A", and (b) is a perspective view showing the lens-barrel 10 which is viewed from an obliquely upper side (object side) in FIG. 1. A first accommodation part 10A whose inner peripheral face is a hollow part in a substantially cylindrical shape is provided on an object side (upper side in the drawing) of the lens-barrel 10, and a bottom face on an image side of the first accommodation part 10A is a first placing part 11 which is abutted with the first lens "L1". Further, an image side (lower side in the drawing) with respect to the first placing part 11 is provided with a second accommodation part 10B which is coaxial with the first accommodation part 10A and is a hollow part in a substantially cylindrical shape whose diameter is smaller than that of the first accommodation part 10A. A bottom face on an image side of the second accommodation part 10B is a second placing part (placing face) 12 which is abutted with a cemented lens "L60" (image side lens described below). Center axes of the first accommodation part 10A and the second accommodation part 10B are common and are coincided with the optical axis "A". Further, as shown in (a) of FIG. 2, an inner peripheral face of the second accommodation part 10B is actually formed so as to gradually become smaller from an object side toward an image side.

In FIG. 1, lens surfaces (faces through which light passes for forming an image) on an object side and an image side of each of the lenses are processed to appropriate curved surfaces (convex curved face and concave curved face) so that the lens unit 1 is capable of obtaining desired imaging characteristics. In the following descriptions, a lens surface on an object side of each lens is referred to as a first surface "R1", and its lens surface on an image side is referred to as a second surface "R2". Further, in a shape of a lens surface (convex curved face or concave curved face), a shape of the first surface "R1" means a shape viewed from an object side, and a shape of the second surface "R2" means a shape viewed from an image side.

Generally, as material constituting a lens in such a small imaging device, there are two kinds of glass and resin material. The former is material whose mechanical strength is high but expensive, and the latter is material whose mechanical strength is low but inexpensive. Further, a thermal expansion coefficient of glass is smaller than that of resin material and thus, it is preferable to use a lens made of glass as a lens in which minute changes of a shape and a position due to thermal expansion at a high temperature largely affect imaging characteristics (change of focal position and the like). Therefore, in order to make the lens unit 1 high in performance and reduce its cost, it is preferable that glass is used only in a lens that glass is preferable, and resin material is used in other lenses.

From the viewpoint described above, in this embodiment, the first lens "L1" disposed on the most object side is made of glass which is hard to be scratched because it is located at the most outside of the imaging device 1. Further, a change in focal distance due to temperature change remarkably appears in the lenses (fourth lens "L4" and fifth lens "L5") adjacent to the diaphragm 20 and thus, one of the lenses (in this embodiment, the fifth lens "L5") is made of glass. As other lenses, inexpensive resin material is used.

The first lens "L1" is a negative lens whose lens surface "L1R1" on the object side is a convex curved face and whose lens surface "L1R2" on the image side is a concave curved face. The lens surface "L1R1" occupies substantially the whole of the upper face of the first lens "L1". In a lower face side (image side) of the first lens "L1", a first lower face "L1A" of the first lens constituted by a flat face which is perpendicular to the optical axis "A" is provided on an outer side with respect to the lens surface "L1R2". In a further outer side of the first lower face "L1A" of the first lens, a second lower face "L1B" of the first lens is provided which is parallel to the first lower face "L1A" of the first lens and is located on an object side (upper side in the drawing) with respect to the first lower face "L1A". Further, the most outer peripheral part of the first lens "L1" constitutes a first lens outer peripheral face "L1C" in a cylindrical shape with the optical axis "A" as a center axis. Among these faces, the lens surfaces "L1R1" and "L1R2" are optically used and other faces are used for fixing the first lens "L1" to the lens-barrel 10.

In FIG. 1, an upper end side of the lens-barrel 10 is formed to be a first lens engaging part 13 which is bent toward the optical axis "A" (center) side so that movement of the first lens "L1" to an object side is restricted. Further, the first lower face "L1A" of the first lens is abutted with a first placing face 11 of the lens-barrel 10. Therefore, a positional relationship in the optical axis "A" direction of the first lens "L1" with respect to the lens-barrel 10 is determined by the first lens engaging part 13 on an object side (upper side in the drawing) and is determined by the first placing face 11 on an image side (lower side in the drawing). In this case, on an outer side with respect to the first lower face "L1A" of the first lens, an O-ring 30 in a ring shape which is pressed and elastically deformed in a direction perpendicular to the optical axis "A" direction is disposed in a space between the second lower face "L1B" of the first lens and the first placing face 11 and thus, a waterproof function in an inside of the lens-barrel 10 is attained. The shape of the first lens engaging part 13 as described above is a shape after having been processed for fixing the first lens 11 to the lens-barrel 10. A shape on an upper end part side of the lens-barrel 10 before fixing is, as shown in (a) of FIG. 2, formed so that the first lens "L1" is capable of being inserted from an upper side into an inside of the lens-barrel 10 as shown in FIG. 1.

Further, the first lens outer peripheral face "L1C" is abutted with an inner peripheral face of the first accommodation part 10A of the lens-barrel 10. As a result, a positional relationship in a direction perpendicular to the optical axis "A" between the first lens "L1" and the lens-barrel 10 is determined. In other words, the first lens "L1" is fixed to the lens-barrel 10 by the structure described above.

The second lens "L2" is a negative lens whose lens surface "L2R1" on an object side is a convex curved face and whose lens surface "L2R2" on an image side is a concave curved face. In an object side of the second lens "L2" (upper side in the drawing), an outer side of the lens surface "L2R1" is provided with a first upper face L2A of the second lens which is a flat face perpendicular to the optical axis "A" and is located on an image side (lower side in the drawing) with respect to the lens surface "L2R1". Further, in an image side of the second lens "L2" (lower side in the drawing), an outer side with respect to the lens surface "L2R2" is provided with a stepped part (engagement structure) "L2B" which is constituted of a face parallel to the optical axis "A" and a face perpendicular to the optical axis "A". A second lens outer peripheral face "L2C" which is a face constituting the outermost periphery of the second lens "L2" is abutted with an inner peripheral face of the second accommodation part 10B. The second lens outer peripheral face "L2C" is formed in a substantially conical face shape whose inside diameter around the optical axis "A" is gradually reduced toward an image side. A positional relationship in a direction perpendicular to the optical axis "A" between the second lens "L2" and the lens-barrel 10 is determined by the structure.

Further, in a region on an inner side (side near to the optical axis "A") with respect to the first placing part 11 and on an outer side with respect to the lens surface "L1R2" and the lens surface "L2R1", an elastic member 40, which is structured of an elastic body and is thin in the optical axis "A" direction, is disposed between the first upper face L2A of the second lens and the first lower face "L1A" of the first lens. In other words, the first lens "L1" and the second lens "L2" are not directly contacted with each other in a direction along the optical axis "A" and the elastic member 40 is provided between these lenses.

The third lens "L3" is a positive lens whose lens surface "L3R1" on an object side is a concave curved face and whose lens surface "L3R2" on an image side is a convex curved face. In an object side (upper side in the drawing) of the third lens "L3", an outer side with respect to the lens surface "L3R1" is provided with a stepped part (engagement structure) L3A which is formed so as to engage with the stepped part "L2B" of the second lens "L2". Further, in an image side (lower side in the drawing) of the third lens "L3", an outer side with respect to the lens surface "L3R2" is provided with a stepped part (engagement structure) "L3B" which is constituted of a face parallel to the optical axis "A" and a face perpendicular to the optical axis "A". Further, a third lens outer peripheral face "L3C" which is a face in a substantially cylindrical shape constituting the outermost periphery of the third lens "L3" is not contacted with the inner peripheral face of the second accommodation part 10B.

The fourth lens "L4" is a positive lens whose surface "L4R1" on an object side is a concave curved face and whose surface "L4R2" on an image side is a convex curved face. In an object side (upper side in the drawing) of the fourth lens "L4", an outer side with respect to the lens surface "L4R1" is provided with a stepped part (engagement structure) L4A which is formed so as to engage with the stepped part "L3B" of the third lens "L3". Further, in an image side (lower side in the drawing) of the fourth lens "L4", an outer side with respect to the lens surface "L4R2" is provided with a stepped part (engagement structure) "L4B" which is constituted of a face parallel to the optical axis "A" and a face perpendicular to the optical axis "A". Further, a fourth lens outer peripheral face "L4C" which is a face in a substantially cylindrical shape constituting the outermost periphery of the fourth lens "L4" is not contacted with the inner peripheral face of the second accommodation part 10B. In other words, the third lens "L3" and the fourth lens "L4" are not contacted with the lens-barrel 10.

As described above, the fifth lens "L5" is made of glass and is a positive lens whose surface "L5R1" on an object side is a convex curved face and whose surface "L5R2" on an image side is a convex curved face. However, different from other lenses, the fifth lens "L5" is accommodated in the lens-barrel 10 in a state that the fifth lens "L5" is press-fitted and integrally fixed to a lens holder 51 made of resin material to be structured as a fifth lens body "L50". In other words, the fifth lens "L5" is treated as a lens similarly to the third lens "L3" and the fourth lens "L4" made of resin material in a state that the fifth lens "L5" is constituted as the fifth lens body "L50".

In an object side (upper side in the drawing) of the fifth lens body "L50", the lens holder 51 on an outer side with respect to the fifth lens "L5" is provided with a stepped part (engagement structure) "L50A" which is formed so as to engage with the stepped part "L4B" of the fourth lens "L4". Further, in an image side (lower side in the drawing) of the fifth lens body "L50", an outer side with respect to the fifth lens "L5" is provided with a protruded part "L50B" which is partly protruded to an image side (lower side in the drawing). The protruded part "L50B" will be described in detail below. Further, a fifth lens body outer peripheral face "L50C" which is a face constituting the outermost periphery of the fifth lens body "L50" is abutted with the inner peripheral face of the second accommodation part 10B. The fifth lens body outer peripheral face "L50C" is formed in a substantially conical face shape whose inside diameter around the optical axis "A" is gradually reduced toward an image side. A positional relationship in a direction perpendicular to the optical axis "A" between the fifth lens body "L50" (fifth lens "L5") and the lens-barrel 10 is determined by the structure.

The sixth lens "L6" is a negative lens whose surface "L6R1" on an object side is a concave curved face and whose surface "L6R2" on an image side is a concave curved face. The seventh lens "L7" is smaller in an outside diameter than the sixth lens "L6" and is a positive lens whose surface "L7R1" on an object side is a convex curved face and whose surface "L7R2" on an image side is a convex curved face. Further, lens surfaces of the sixth lens "L6" and the seventh lens "L7" facing each other are fitted and joined to each other and, as a result, a cemented lens (image side lens) "L60" is constituted on the most image side. In other words, an image side lens which is a lens substantially on the most image side is the cemented lens "L60" in which the lens surface "L6R2" on an image side of the sixth lens "L6" and the lens surface "L7R1" on an object side of the seventh lens "L7" are fitted and joined to each other.

In an object side (upper side in the drawing) of the cemented lens "L60" (sixth lens "L6"), an outer side with respect to the lens surface "L6R1" is provided with a cemented lens upper face "L6A" which is a flat face abutted with the protruded part "L50B" of the fifth lens body "L50". In FIG. 1, for convenience, the protruded part "L50B" is abutted with the cemented lens upper face "L6A" on both sides with the optical axis "A" interposed therebetween, but actual detailed constitution will be described below.

Further, in an image side (lower side in the drawing) of the cemented lens "L60" (sixth lens "L6"), an outer side with respect to the lens surface "L7R2" is provided with a cemented lens lower face "L6B" which is a flat face perpendicular to the optical axis "A". The cemented lens lower face "L6B" is abutted with the second placing part (placing face) 12. A sixth lens outer peripheral face "L6C" which is a face constituting the outermost periphery of the cemented lens "L60" (sixth lens "L6") is abutted with the inner peripheral face of the second accommodation part 10B. The sixth lens outer peripheral face "L6C" is formed in a substantially conical face shape whose inside diameter around the optical axis "A" is gradually reduced toward an image side. Therefore, a position of the cemented lens "L60" in a direction along the optical axis "A" is restricted by the lens-barrel 10 (second placing part 12) on an image side.

In this case, the fifth lens body "L50" (protruded part "L50B") is engaged with the cemented lens "L60" on an image side and thus, a position of the fifth lens body "L50" in a direction along the optical axis "A" is restricted by the second placing part 12 (lens-barrel 10) through the cemented lens "L60" on an image side.

Further, as structured as described above, a position of the fourth lens "L4" in a direction along the optical axis "A" is restricted by the lens-barrel 10 through the fifth lens body "L50" and the cemented lens "L60" on an image side by engaging the stepped part "L4B" with the stepped part "L50A". On the other hand, a position of the fourth lens "L4" in a direction perpendicular to the optical axis "A" is determined by the inner peripheral face of the second accommodation part 10B through the fifth lens body "L50" by engaging the stepped part "L4B" with the stepped part "L50A". Similarly, a position of the third lens "L3" in a direction along the optical axis "A" is restricted on an image side by the lens-barrel 10 through the fourth lens "L4", the fifth lens body "L50" and the cemented lens "L60" by engaging the stepped part "L3B" with the stepped part "L4A". On the other hand, a position of the third lens "L3" in a direction perpendicular to the optical axis "A" is determined by the inner peripheral face of the second accommodation part 10B through the fourth lens "L4" and the fifth lens body "L50" by engaging the stepped part "L3B" with the stepped part "L4A".

Further, as structured as described above, a position of the second lens "L2" in a direction along the optical axis "A" is restricted on an image side by the lens-barrel 10 through the third lens "L3", the fourth lens "L4", the fifth lens body "L50" and the cemented lens "L60" by engaging the stepped part "L2B" with the stepped part "L3A". On the other hand, a position of the second lens "L2" in a direction perpendicular to the optical axis "A" is, as described above, determined by the inner peripheral face of the second accommodation part 10B.

In other words, in the structure described above, the second lens "L2", the fifth lens "L5" (fifth lens body "L50") and the cemented lens "L60" among the second lens "L2" through the cemented lens "L60" (seventh lens "L7") are contact lenses whose outer peripheral parts are abutted with the inner peripheral face of the second accommodation part 10B of the lens-barrel 10. Positional relationships between the contact lenses and the lens-barrel 10 in a direction perpendicular to the optical axis "A" are determined as described above. On the other hand, the third lens "L3" and the fourth lens "L4" are non-contact lenses which are not directly contacted with the inner peripheral face of the second accommodation part 10B. The non-contact lens is directly or indirectly engaged with the contact lenses on the object side and an image side through the stepped parts (engagement structure) described above and thereby, a positional relationship between the contact lens and the non-contact lens in a direction perpendicular to the optical axis "A" is fixed and a positional relationship with respect to the lens-barrel 10 in this direction is fixed. In this manner, all of the positional relationships between the second lens "L2" through the cemented lens "L60" (seventh lens "L7") and the lens-barrel 10 in a direction perpendicular to the optical axis "A" are fixed.

On the other hand, the outer peripheral faces of the third lens "L3" and the fourth lens "L4" are not contacted with the inner peripheral face of the second accommodation part 10B. Therefore, a force is restrained from applying to the third lens "L3" and the fourth lens "L4" (lens system), and to the lens-barrel 10 due to a thermal expansion difference between the third lens "L3" and the fourth lens "L4" and the lens-barrel 10. Accordingly, adverse influence of temperature change on imaging characteristics is reduced.

Figure 3:
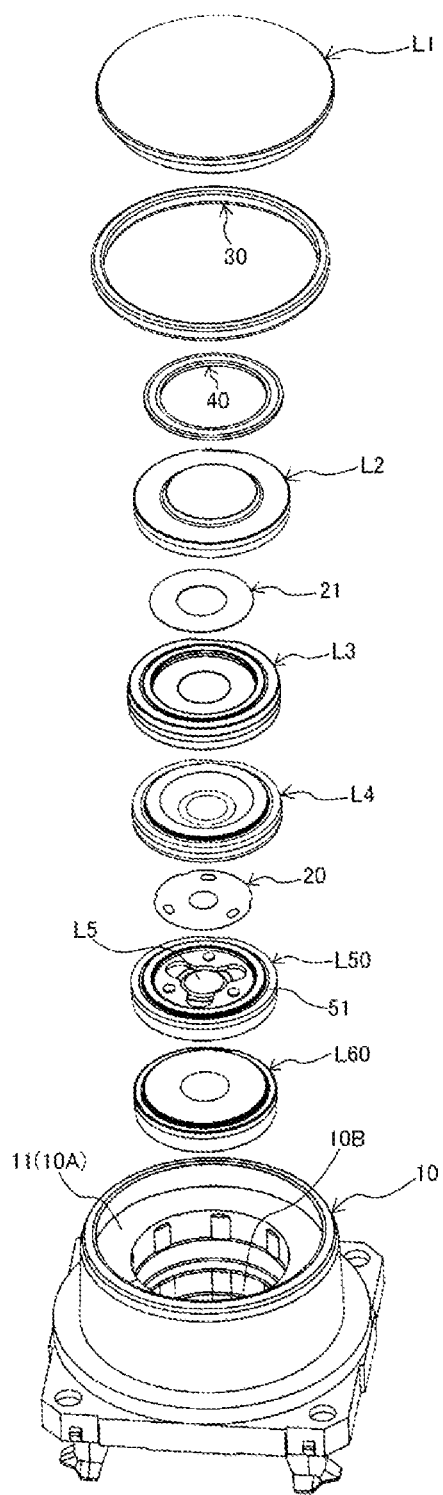
FIG. 3 is an exploded view showing a lens unit in accordance with an embodiment of the present invention.

FIG. 3 is an exploded perspective view showing the lens unit 1, and a light shading plate 21 which is not shown in FIG. 1 is also described. In this embodiment, the cemented lens "L60", the fifth lens body "L50", the diaphragm 20, the fourth lens "L4", the third lens "L3", the light shading plate 21, the second lens "L2", the elastic member 40, the O-ring 30 and the first lens "L1" are successively attached to the lens-barrel 10 from an upper side (object side) in the drawing. As shown in the drawing, the elastic member 40 and the O-ring 30 are formed in a ring shape.

Crystalline plastic (polyethylene, polyamide or polytetrafluoroethylene) which is superior in weather-resistant property is preferably used as material of the lens-barrel 10. On the other hand, the second lens "L2", the third lens "L3", the fourth lens "L4", the sixth lens "L6" and the seventh lens "L7" are constituted of amorphous plastic (polycarbonate or the like) which is superior in lens performance (optical transparency and moldability). Further, the lens holder 51 is constituted of amorphous plastic which is similar to or the same as the fourth lens "L4" and the like and thus, the fifth lens body "L50" can be treated as the same plastic lens as the fourth lens "L4" and the like as a whole. As described above, the first lens "L1" and the fifth lens "L5" are made of glass.

In the structure shown in FIG. 1, the respective lenses are, in the optical axis "A" direction, roughly classified into a first lens group (first lens "L1", second lens "L2", third lens "L3" and fourth lens "L4") which is located on an object side with respect to the diaphragm 20, and a second lens group (fifth lens "L5" (fifth lens body "L50")) and the cemented lens (image side lens) "L60" (sixth lens "L6" and seventh lens "L7")). In the constitution, imaging characteristics by the diaphragm 20 is largely affected by the fourth lens "L4" which is a lens located on the most image side (object side adjacent lens) among the first lens group and adjacent to the diaphragm 20 on an object side, and by the fifth lens "L5" (fifth lens body "L50") which is a lens located on the most object side (image side adjacent lens) among the second lens group and adjacent to the diaphragm 20 on an image side.

Figure 4:
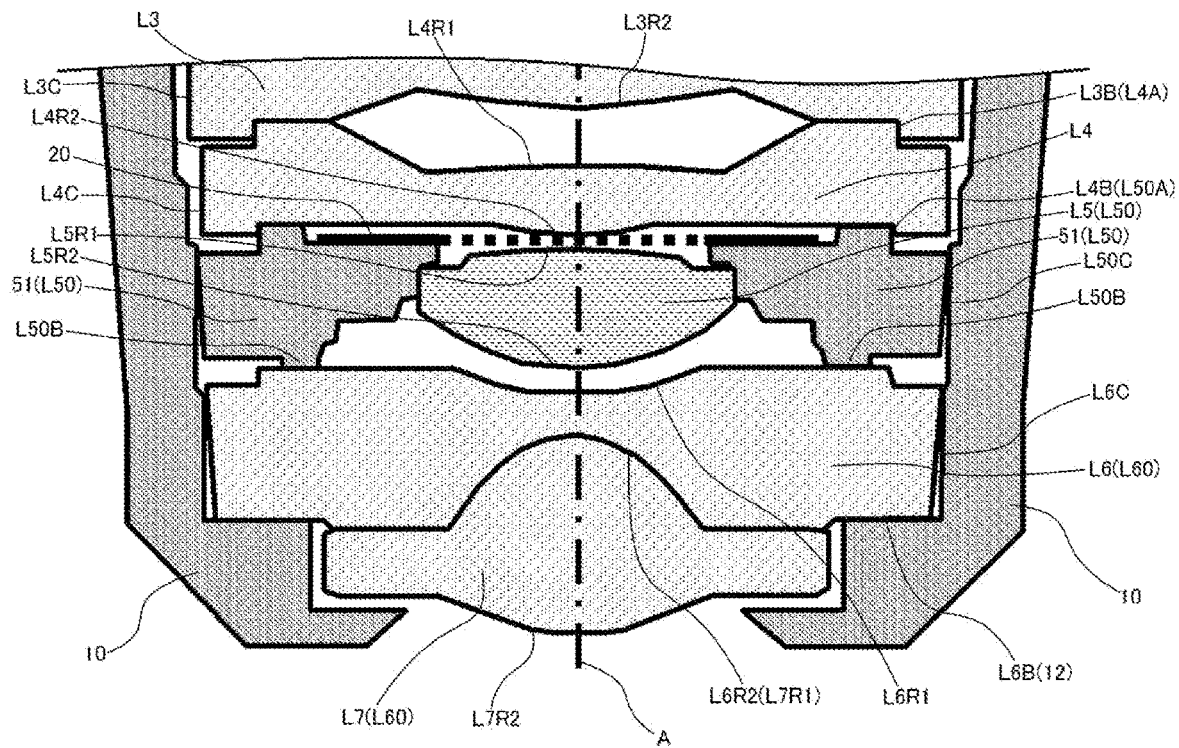
FIG. 4 is an enlarged cross-sectional view showing a structure surrounding an object side adjacent lens, a diaphragm, an image side adjacent lens in a lens unit in accordance with an embodiment of the present invention.

In this embodiment, the imaging characteristics are largely affected by accuracy of a positional relationship of the fifth lens "L5" with respect to the lens-barrel 10, accuracy of a positional relationship between the fifth lens "L5" and the fourth lens "L4", and accuracy of a positional relationship between the fifth lens body "L50" and the cemented lens "L60". Further, positional relationships between the diaphragm 20 and the lenses on the object side and on the image side similarly affect imaging characteristics (aberration). FIG. 4 is an enlarged cross-sectional view showing related portions to these relationships in FIG. 1. Structures for determining these positional relationships with an especially high degree of accuracy will be described below.

Figure 5:
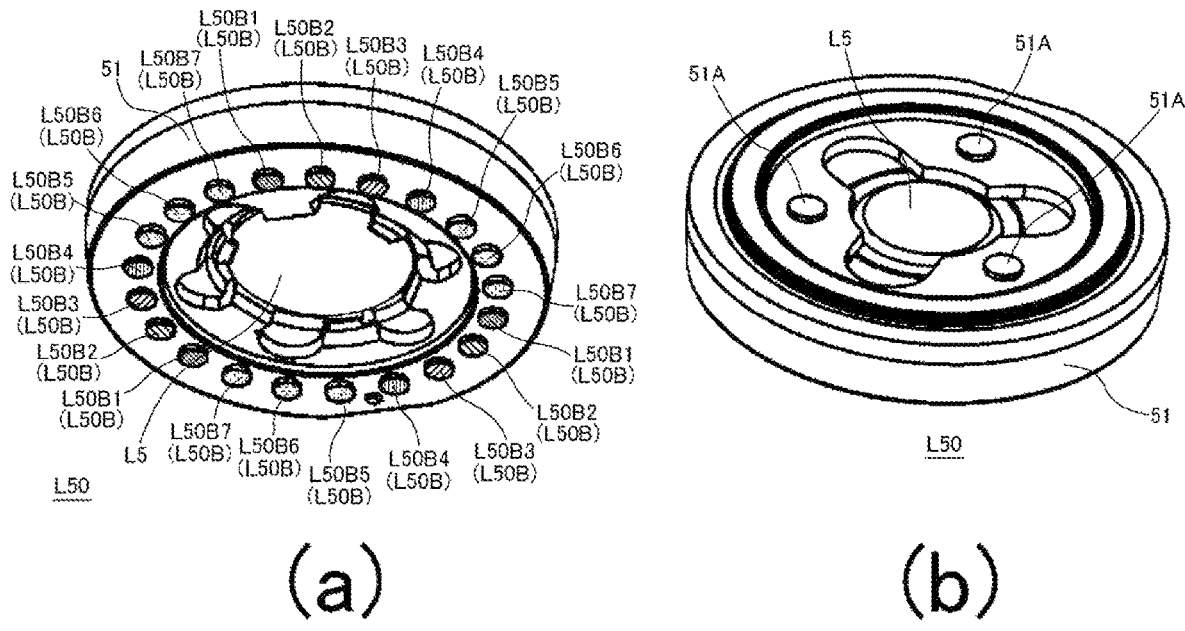
In FIG. 5, (a) is a perspective view showing an image side adjacent lens which is viewed from an image side, and (b) is a perspective view which is viewed from an object side.

As described above, the fifth lens "L5" is integrated with the lens holder 51 to structure the fifth lens body "L50". In FIG. 5, (a) is a perspective view showing the fifth lens body "L50" which is viewed from an image side and (b) is a perspective view showing the fifth lens body "L50" viewed from an object side. In order to obtain satisfactory image forming characteristics, it is required that a distance between the fifth lens "L5" and the cemented lens "L60" in the optical axis "A" direction is brought close to a predetermined designed value with a high degree of accuracy. As shown in FIG. 1 and FIG. 4, the distance is determined by abutting the protruded part "L50B" formed in the lens holder 51 with the cemented lens upper face "L6A" of the cemented lens "L60".

In this embodiment, as shown in (a) of FIG. 5, twenty-one protruded parts "L50B" are formed at equal intervals in a circumferential direction, and they are classified depending on a protruding amount to an image side into a group (protruded part group) of "L50B1" through a group of "L50B7", each of which is comprised of three protruded parts "L50B". The protruding amount is set so as to become larger as going from "L50B1" to "L50B7". In (a) of FIG. 5, surfaces of the protruded parts "L50B1" through "L50B7" are hatched for convenience.

As described above, the fifth lens "L5" is made of glass. Commonly, a lens surface of a glass lens is formed in a predetermined shape with a high degree of accuracy by polishing processing. On the other hand, regarding thickness of a lens, in a case of a plastic lens manufactured by resin molding, its accuracy becomes in a range of 1 µm or less through about several µm but, in a case of a glass lens, its thickness is rougher and the accuracy becomes several µm through about several tens of µm. An error of the thickness can be compensated by finely adjusting a distance between the fifth lens "L5" and the adjacent lens (cemented lens "L60").

Therefore, when the lens unit 1 is to be manufactured, the protruded part "L50B" which is actually abutted with the cemented lens upper face "L6A" can be selected among the "L50B1" through the "L50B7" so that a distance between the fifth lens "L5" and the cemented lens "L60" becomes an appropriate value depending on an actually measured thickness of the fifth lens "L5". In this case, the protruded parts "L50B" of the protruded part groups whose protruding amount is larger than the selected protruded part group can be removed mechanically. The protruded parts "L50B1" through "L50B7" are formed in the lens holder 51 made of resin material and thus, such machining can be performed easily. Further, when three protruded parts are provided for each of the protruded parts "L50B1" through "L50B7" as shown in the drawing, the fifth lens body "L50" can be supported at three points on the cemented lens "L60" and thus, a distance between the fifth lens "L5" and the cemented lens "L60" can be determined with a high degree of accuracy while compensating a variation of thickness of the fifth lens "L5" as described above. In addition to a variation of thickness of the fifth lens "L5", variations at the time of manufacturing of the cemented lens "L60" and the lens-barrel 10 can be similarly compensated. On the other hand, the fifth lens body outer peripheral face "L50C" is abutted with the inner peripheral face of the second accommodation part 10B and thus, a positional relationship of the fifth lens "L5" (fifth lens body "L50") with respect to the lens-barrel 10 in a direction perpendicular to the optical axis "A" is determined. A stepwise difference of the protruding amounts of the protruding parts "L50B1" through "L50B7" is determined depending on a variation of thickness of the glass lens and the like, and is, for example, set to be about 5 µm.

Figure 6:
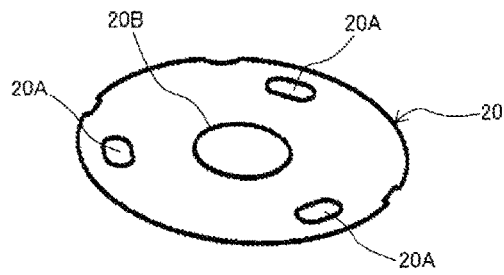
FIG. 6 is a perspective view showing a diaphragm.

Further, as shown in (b) of FIG. 5, an object side of the lens holder 51 is formed with three protruded parts 51A whose cross-sectional shape perpendicular to the optical axis "A" is circular at equal intervals in a circumferential direction. FIG. 6 is an enlarged perspective view showing the diaphragm 20 which is viewed in a direction corresponding to (b) of FIG. 5. The diaphragm 20 which is thinly formed is formed with three positioning holes 20A penetrating through the diaphragm 20 in the optical axis "A" direction so as to correspond to the protruded parts 51A. Therefore, the diaphragm 20 can be fixed to the fifth lens body "L50" by engaging the positioning holes 20A with the protruded parts 51A. In FIG. 1, the diaphragm 20 is provided in a state perpendicular to the optical axis "A" but, in a case that this angle is varied, a ghost may be generated in an imaging device. In order to prevent this problem, the diaphragm 20 is fixed to the fifth lens body "L50" in an appropriate state by using the above-mentioned structure, and an angle of the diaphragm 20 with respect to the optical axis "A" is restrained from being varied.

In this case, as shown in FIG. 6, the positioning hole 20A is formed longer in a circumferential direction around the optical axis "A" than in a radial direction with respect to the optical axis "A". As a result, the diaphragm 20 can be turned by only a slight amount around the optical axis "A" in a state that the diaphragm 20 is attached and thus, mounting of the diaphragm 20 on the fifth lens body "L50" is especially easy. On the other hand, when an opening 20B of the diaphragm 20 is formed in a circular shape with the optical axis "A" as a center, a shape of the opening 20B is not changed even when the diaphragm 20 is turned as described above and thus, image forming characteristics are not affected even in a case that the diaphragm 20 is turned. In the example described above, the protruded part 51A is formed in a circular shape. However, the shape may include a shape other than a circular shape and, further commonly, the shape may be formed so that a length of the positioning hole 20A along a circumferential direction around the optical axis "A" is set longer than a length of the protruded part 51A along the same direction. According to this structure, work for attaching the diaphragm to the lens holder is easy and adverse influence to image forming characteristics due to the work does not occur.

On the other hand, positional relationships between the fourth lens "L4" and the fifth lens body "L50" in the optical axis "A" direction and in the direction perpendicular to the optical axis "A" are, as described above, determined by engaging the stepped part "L4B" with the stepped part "L50A" of the fifth lens body "L50". Therefore, the positional relationships between the fourth lens "L4", the diaphragm 20, the fifth lens body "L50" and the cemented lens "L60" and the inner peripheral face of the second accommodation part 10B (lens-barrel 10) surrounding these members are determined by the structure described above. Further, the fourth lens "L4" and the lens-barrel 10 are constituted of different resin materials and thus, their thermal expansion coefficients are different from each other. Therefore, although there is a thermal expansion difference (difference of expansion and shrinkage) between these resin materials due to temperature change, the fourth lens "L4" and the lens-barrel 10 are not contacted with each other and thus, an adverse effect such as distortion does not occur in the fourth lens "L4" due to the thermal expansion difference.

In this case, the fifth lens body "L50" is structured so that the lens holder 51 is attached to a periphery of the fifth lens "L5" having a small diameter, and the lens holder 51 is constituted of the same resin material as the fourth lens "L4". Thermal expansion coefficients of the fifth lens "L5" and the lens holder 51 are different from each other, but the fifth lens "L5" has a small diameter and is made of glass and thus, its thermal expansion coefficient is small and amounts in expansion and shrinkage of the fifth lens "L5" are small when temperature changes. Further, the lens holder 51 and the fourth lens "L4" are constituted of the same resin material and thus, a thermal expansion difference between the fifth lens body "L50" and the fourth lens "L4" is substantially small. In the structure described above, in order to determine the positions of the fourth lens "L4" in the optical axis "A" direction and in the direction perpendicular to the optical axis "A", the fourth lens "L4" is engaged with the fifth lens body "L50" (lens holder 51) by an engagement structure. However, a thermal expansion difference between these members is small as described above and thus, an adverse effect such as distortion does not occur in the fourth lens "L4" when temperature changes. Therefore, in the lens unit 1 described above, even when temperature changes, satisfactory image forming characteristics are maintained.

Figure 7:
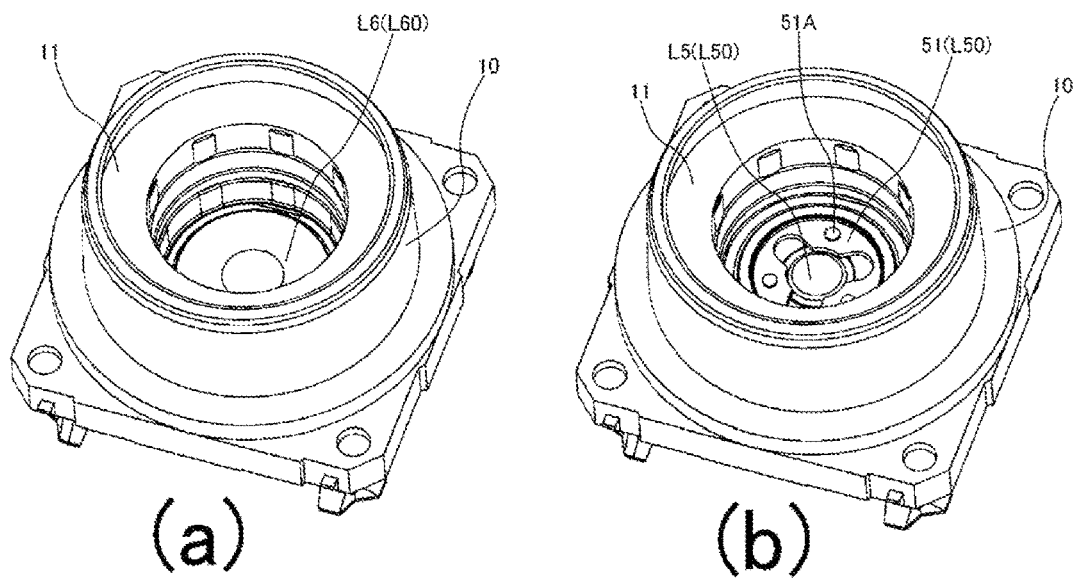
FIG. 7 illustrates perspective views showing states in a process of assembling a lens unit in accordance with an embodiment of the present invention.
Figure 7:
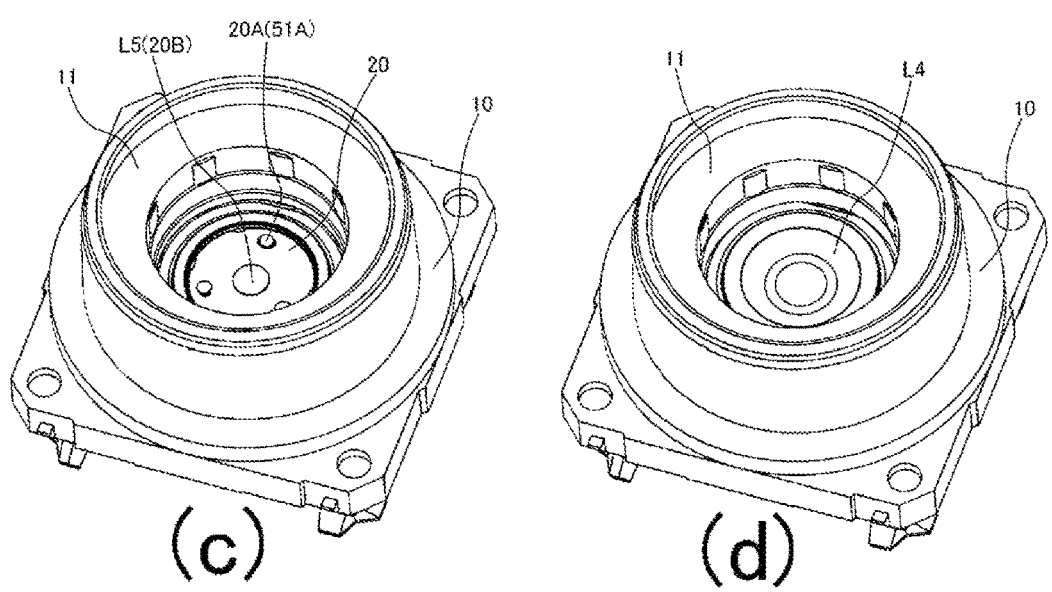

FIG. 7 illustrates perspective views showing states when the lens unit 1 is assembled, in which (a) of FIG. 7 shows a state before the fifth lens body "L50" is attached, (b) of FIG. 7 shows a state after the fifth lens body "L50" has been attached, (c) of FIG. 7 shows a state after the diaphragm 20 has been attached, and (d) of FIG. 7 shows a state after the fourth lens "L4" has been attached. As described above, when the lens unit 1 is to be manufactured, the fifth lens body "L50", the diaphragm 20 and the fourth lens "L4" can be easily attached and fixed to an inside of the lens-barrel 10 with a high degree of accuracy.

In the embodiment described above, the fourth lens "L4" (object side adjacent lens) is made of resin material, and the fifth lens "L5" (image side adjacent lens) is made of glass. However, it may be constituted that an object side adjacent lens is made of glass and an image side adjacent lens is made of resin material. In this case, a lens holder similar to the embodiment described above is used on a side of an object side adjacent lens, and the lens holder is fixed to an inner peripheral face of the second accommodation part, and the image side adjacent lens is provided so as not to contact with the inner peripheral face and, similarly to the embodiment described above, the image side adjacent lens is engaged with the object side adjacent lens (lens holder). However, it is preferable that the image side adjacent lens is made of glass because variation of a view angle due to temperature change can be further effectively suppressed.

Principal Features in this Embodiment

Features in this embodiment will be simply summarized as follows.

(1) The lens unit 1 includes a first lens group disposed on an object (Ob) side along an optical axis "A", a second lens group disposed on an image (Im) side along the optical axis "A" with respect to the first lens group, a diaphragm 20 disposed between the first lens group and the second lens group, and a lens-barrel 10 which holds the first lens group, the diaphragm 20 and the second lens group. One of an object side adjacent lens (fourth lens "L4"), which is disposed on the most image side in the first lens group and is adjacent to the diaphragm 20 in the optical axis "A" direction, and an image side adjacent lens (fifth lens "L5"), which is disposed on the most object side in the second lens group and is adjacent to the diaphragm 20 in the optical axis "A" direction, is one side lens made of glass, and the other is the other side lens made of resin material, and the lens-barrel 10 is made of resin material which is different from the other side lens. The object side adjacent lens (fourth lens "L4"), the diaphragm 20 and the image side adjacent lens (fifth lens "L5") are accommodated in a lens accommodation part (second accommodation part 12B) provided in the lens-barrel 10. The one side lens is directly or indirectly abutted with an inner peripheral face of the lens accommodation part (second accommodation part 12B) and thereby, a positional relationship between the lens-barrel 10 and the one side lens in a direction perpendicular to the optical axis "A" is fixed, and the other side lens is not contacted with the inner peripheral face and is engaged with the one side lens and thereby, a positional relationship between the one side lens and the other side lens in the direction perpendicular to the optical axis "A" is fixed.

In the structure described above, in the object side adjacent lens and the image side adjacent lens, only the one side lens which is made of glass is abutted with the inner peripheral face of the lens accommodation part (second accommodation part 12B) in the lens-barrel 10 and thereby, a position in a direction perpendicular to the optical axis "A" is fixed. The other side lens is not abutted with the inner peripheral face, but a positional relationship in a direction perpendicular to the optical axis "A" is fixed between the one side lens and the other side lens and, as a result, a positional relationship between the lens-barrel 10 and the other side lens is fixed in this direction. In this embodiment, one side lens which is abutted with the inner peripheral face (lens-barrel 10) is made of glass and thus, occurrence of distortion of the one side lens accompanied with temperature change is suppressed. On the other hand, the other side lens made of resin material is not abutted with the inner peripheral face and thus, occurrence of distortion of the other side lens accompanied with temperature change is also suppressed. Further, the one side lens is made of glass and thus, expansion and shrinkage of the one side lens due to temperature change are suppressed. Therefore, deterioration of image forming characteristics (deterioration of resolution) is suppressed when temperature changes.

(2) An outer side of the one side lens (fifth lens "L5") viewed in the optical axis "A" direction is supported by the lens holder 51 which is made of resin material similar to or the same as the other side lens (fourth lens "L4"), and an outer peripheral face around the optical axis "A" of the lens holder 51 is abutted with the inner peripheral face of the second accommodation part 12B. According to this structure, a lens body (fifth lens body "L50") is structured by combining the one side lens (fifth lens "L5") which is made of glass with the lens holder 51 as described above and thus, the lens body can be treated similarly to a lens (fourth lens "L4") which is made of resin material, and a thermal expansion difference between the lens body and the other side lens (fourth lens "L4" and the like) adjacent to the lens body is reduced. Further, the one side lens (fifth lens "L5") made of glass is indirectly contacted with the lens-barrel 10 side through the lens holder 51 made of resin material as described above and thus, distortion of the one side lens (fifth lens "L5") is further reduced when temperature changes. Further, although a position of the other side lens (fourth lens "L4" and the like) is determined by the fifth lens body "L50" which is engaged with the other side lens (fourth lens "L4"), a thermal expansion difference between the lens holder 51 and the other side lens (fourth lens "L4" and the like) is small and thus, an adverse effect (occurrence of distortion and the like) on the other side lens (fourth lens "L4" and the like) affected by the fifth lens body "L50" is suppressed when temperature changes.

(3) The one side lens is the image side adjacent lens (fifth lens "L5") and the other side lens is the object side adjacent lens (fourth lens "L4"). According to this structure, the image side adjacent lens located on an image side with respect to the diaphragm 20 is made of glass. In comparison with a case that the object side adjacent lens is made of glass, when the image side adjacent lens is made of glass, variation of a view angle due to temperature change can be further effectively restrained.

(4) In the second lens group, the image side lens (cemented lens "L60") is provided so as to be adjacent to the image side adjacent lens (fifth lens "L5") on an image side, and the image side lens (cemented lens "L60") is engaged with a placing face (second placing part 12) of the lens accommodation part (second accommodation part 12B) on an image side, and the lens holder 51 is provided with a plurality of protruded parts "L50B" which are protruded to an image side, and the plurality of the protruded parts "L50B" is sorted into a plurality of protruded part groups ("L50B1" through "L50B7") depending on their protruding amounts, and a plurality of the protruded parts "L50B" which belong to one protruded part group is engaged with the image side lens (cemented lens "L60") on an image side and thereby, movement to an image side of the image side adjacent lens (fifth lens "L5") is restricted. According to this structure, a distance between the image side lens (cemented lens "L60") and the image side adjacent lens (fifth lens "L5") is determined by a protruding amount of the protruded part "L50B". In this case, a plurality of the protruded part groups in which protruding amounts are different from each other is provided and, when only protruded part "L50B" of a selected protruded part group is abutted with the image side lens (cemented lens "L60"), the distance can be finely adjusted. On the other hand, the image side lens (cemented lens "L60") is engaged with the placing face (second placing part 12) and, as a result, the image side adjacent lens (fifth lens "L5") is also indirectly engaged with the placing face (second placing part 12).

(5) The diaphragm 20 is formed with a plurality of positioning holes 20A in a circumferential direction around the optical axis "A" which penetrate through the diaphragm 20 in the optical axis "A" direction, and the lens holder 51 is formed with a plurality of protruded parts 51A protruded to an object side so as to correspond to the positioning holes 20A, and the diaphragm 20 is attached to a side of the image side adjacent lens (fifth lens "L5") by engaging the protruded parts 51A with the positioning holes 20A. According to this structure, the diaphragm 20 can be fixed to the lens holder 51 (fifth lens body "L50") by using the protruded parts 51A and the positioning holes 20A. As a result, manufacturing is easy and a positional relationship between the image side adjacent lens (fifth lens "L5") and the diaphragm 20 is maintained with a high degree of accuracy.

(6) A length of the positioning hole 20A along a circumferential direction around the optical axis "A" is set to be larger than a length along the circumferential direction of the corresponding protruded part 51A. According to this structure, work for attaching the diaphragm 20 to the lens holder 51 (fifth lens "L5" side) is easily performed.

In accordance with an embodiment of the present invention, in addition to the above-mentioned embodiment, another lens system including the object side adjacent lens, the diaphragm, the image side adjacent lens, and the like may be constituted. In this case, the number of other lenses in the lens system is arbitrary.

While the description above refers to particular embodiments of the present invention, it will be understood that many modifications may be made without departing from the spirit thereof. The accompanying claims are intended to cover such modifications as would fall within the true scope and spirit of the present invention.

The invention claimed is:

1. A lens unit, comprising:
   a first lens group, disposed on an object side along an optical axis;
   a second lens group, disposed on an image side along the optical axis with respect to the first lens group;
   a diaphragm, disposed between the first lens group and the second lens group; and
   a lens-barrel, configured to hold the first lens group, the diaphragm and the second lens group;
   wherein an object side adjacent lens is disposed on a most image side in the first lens group and is adjacent to the diaphragm in a direction of the optical axis, and an image side adjacent lens is disposed on a most object side in the second lens group and is adjacent to the diaphragm in the direction of the optical axis, one of the object side adjacent lens and the image side adjacent lens is an one side lens made of glass, and the other of the object side adjacent lens and the image side adjacent lens is an other side lens made of resin material, and the lens-barrel is made of resin material which is different from that of the other side lens;
   wherein the object side adjacent lens, the diaphragm and the image side adjacent lens are accommodated in a lens accommodation part provided in the lens-barrel;
   wherein the one side lens is directly or indirectly abutted with an inner peripheral face of the lens accommodation part and thereby, a positional relationship between the lens-barrel and the one side lens in a direction perpendicular to the optical axis is fixed; and
   wherein the other side lens is not contacted with the inner peripheral face and is engaged with the one side lens and thereby, a positional relationship between the one side lens and the other side lens in the direction perpendicular to the optical axis is fixed.

2. The lens unit according to claim 1, wherein
   an outer side of the one side lens viewed in the direction of the optical axis is supported by a lens holder which is made of resin material as same as that of the other side lens, and an outer peripheral face around the optical axis of the lens holder is abutted with the inner peripheral face.

3. The lens unit according to claim 2, wherein
the one side lens is the image side adjacent lens, and
the other side lens is the object side adjacent lens.

4. The lens unit according to claim 3, wherein
in the second lens group, an image side lens is provided to be adjacent to the image side adjacent lens on an image side,
the image side lens is engaged with a placing face of the lens accommodation part on an image side,
the lens holder comprises a plurality of protruded parts which are protruded to an image side,
the plurality of the protruded parts is sorted into a plurality of protruded part groups depending on a protruding amount, and
a plurality of the protruded parts which belong to one protruded part group is engaged with the image side lens on an image side and thereby, movement to an image side of the image side adjacent lens is restricted.

5. The lens unit according to claim 3, wherein
the diaphragm is formed with a plurality of positioning holes in a circumferential direction around the optical axis, each of the positioning holes penetrating through the diaphragm in the direction of the optical axis,
the lens holder is formed with a plurality of protruded parts protruded to an object side so as to correspond to the positioning holes, and
the diaphragm is attached to a side of the image side adjacent lens by engaging the protruded parts with the positioning holes.

6. The lens unit according to claim 5, wherein
a length of the positioning hole along a circumferential direction around the optical axis is set to be larger than a length along the circumferential direction of the protruded part corresponding to the positioning hole.

7. The lens unit according to claim 4, wherein
the diaphragm is formed with a plurality of positioning holes in a circumferential direction around the optical axis, each of the positioning holes penetrating through the diaphragm in the direction of the optical axis,
the lens holder is formed with a plurality of protruded parts protruded to an object side so as to correspond to the positioning holes, and
the diaphragm is attached to a side of the image side adjacent lens by engaging the protruded parts with the positioning holes.

8. The lens unit according to claim 7, wherein
a length of the positioning hole along a circumferential direction around the optical axis is set to be larger than a length along the circumferential direction of the protruded part corresponding to the positioning hole.

* * * * *